United States Patent
Xie et al.

(10) Patent No.: US 11,049,286 B2
(45) Date of Patent: Jun. 29, 2021

(54) DEEP NEURAL NETWORK COLOR SPACE OPTIMIZATION

(71) Applicant: Hewlett Packard Enterprise Development LP, Houston, TX (US)

(72) Inventors: Xiufeng Xie, Palo Alto, CA (US); Kyu-Han Kim, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 71 days.

(21) Appl. No.: 16/527,954

(22) Filed: Jul. 31, 2019

(65) Prior Publication Data

US 2021/0035331 A1 Feb. 4, 2021

(51) Int. Cl.
*G06K 9/00* (2006.01)
*G06T 9/00* (2006.01)
(Continued)

(52) U.S. Cl.
CPC ............ *G06T 9/002* (2013.01); *G06T 5/002* (2013.01); *H04N 1/6027* (2013.01);
(Continued)

(58) Field of Classification Search
CPC ........ H04N 19/186; H04N 19/85; H04N 1/64; H04N 1/648; H04N 1/6058; H04N 1/6077; H04N 1/6027; H04N 9/67; G06T 9/00; G06T 9/002; G06T 3/4046; G06T 7/90; G06T 5/007; G06T 5/002; G06T 2207/20076; G06T 2207/20081;
(Continued)

(56) References Cited

U.S. PATENT DOCUMENTS 5,892,847 A * 4/1999 Johnson ................. H04N 19/30
375/E7.04
6,125,201 A 9/2000 Zador
(Continued)

OTHER PUBLICATIONS

Wu, Min et al., "Remote Sensing Image Colorization Using Symmetrical Multi-scale DCGAN in YUC Color Space", The Visual Computer, Aug. 28, 2020, pp. 1-23. (Year: 2020).*
(Continued)

*Primary Examiner* — Jose L Couso
(74) *Attorney, Agent, or Firm* — Hewlett Packard Enterprise Patent Department (57) ABSTRACT

Example method includes: transmitting a plurality of probe images from an IoT device at an edge network to a server hosting a target DNN, wherein the plurality of images are injected with a limited amount of noise to probe sensitivities of the target DNN to the red, green, and blue colors; receiving a feedback comprising a plurality of DCT coefficients unique to target DNN from the server hosting the target DNN; computing a plurality of color conversion weights based on the feedback received from the server; converting a set of real-time images from RGB color space to YUV color space using the plurality of color conversion weights unique to the target DNN; compressing the set of real-time images using a quantization table unique to the target DNN by the IoT device; and transmitting the compressed set of real-time images to the server hosting the target DNN for DNN inferences.

20 Claims, 8 Drawing Sheets
(5 of 8 Drawing Sheet(s) Filed in Color)

(51) Int. Cl.
  *H04N 1/60* (2006.01)
  *G06T 5/00* (2006.01)
(52) U.S. Cl.
  CPC . *H04N 1/6077* (2013.01); *G06T 2207/10024* (2013.01); *G06T 2207/20084* (2013.01)
(58) Field of Classification Search
  CPC ........... G06T 2207/20084; G06T 2207/10024; G09G 5/06; G06N 3/02; G06N 3/04; G06N 3/08–088; G06N 3/0454; G06N 3/0472; G06N 3/0481; G06N 20/00; G06N 20/20; G06K 9/00147; G06K 9/6247; G06K 9/66
  See application file for complete search history.

(56) References Cited

U.S. PATENT DOCUMENTS

| | | | |
|---|---|---|---|
| 6,819,458 B1* | 11/2004 | Tanaka | H04N 1/6058 345/590 |
| 7,139,022 B1 | 11/2006 | Raffy | |
| 2005/0062992 A1* | 3/2005 | Kishimoto | H04N 1/603 358/1.9 |
| 2006/0280360 A1* | 12/2006 | Holub | H04N 17/045 382/162 |
| 2009/0010534 A1* | 1/2009 | Suzuki | H04N 1/6033 382/166 |
| 2009/0231646 A1* | 9/2009 | Yamauchi | H04N 1/6058 358/523 |
| 2011/0141500 A1* | 6/2011 | Togami | H04N 1/6002 358/1.9 |
| 2012/0128238 A1 | 5/2012 | Kameyama | |
| 2016/0321784 A1 | 11/2016 | Annapureddy et al. | |
| 2017/0339430 A1* | 11/2017 | Kalevo | H04N 1/64 |
| 2019/0082185 A1* | 3/2019 | Satavalekar | H04N 1/413 |
| 2019/0108618 A1* | 4/2019 | Hwang | G06N 3/0454 |
| 2019/0206360 A1* | 7/2019 | Strom | H04N 19/85 |
| 2019/0238866 A1* | 8/2019 | Strom | H04N 1/6027 |
| 2020/0211229 A1* | 7/2020 | Hwang | G06T 3/4046 |

OTHER PUBLICATIONS

Reddy, K. Siva Nagi et al., "Image Compression and Reconstruction Using a New Approach by Artificial Neural Network", International Journal of Image Processing (IJIP), vol. 6: Issue (2), 2012, pp. 68-85. (Year: 2012).*
Clausen, Clifford et al., "Color Image Processing using PCA and Backpropagation Learning", Pattern Recognition 33, The Journal of the Pattern Recognition Society, 2000, pp. 1555-1560. (Year: 2000).*
Agustsson et al., "Generative Adversarial Networks for Extreme Learned Image Compression", CVF, 2018, pp. 221-231.
Athalye et al., "Synthesizing Robust Adversarial Examples", Proceedings of the 35th International Conference on Machine Learning, Jun. 7, 2018, 19 pages.
Carlini et al., "Adversarial Examples Are Not Easily Detected: Bypassing Ten Detection Methods", ACM, Nov. 3, 2017, 12 pages.
Cavigelli et al., "CAS-CNN: A Deep Convolutional Neural Network for Image Compression Artifact Suppression", ETH Library, 2017, 9 pages.
Cordts et al., "The Cityscapes Dataset for Semantic Urban Scene Understanding", CVF, 2016, pp. 3213-3223.
Courbariaux et al., "Binarized Neural Networks: Training Deep Neural Networks with Weights and Activations Constrained to +1 or −1", NIPS, 2016, 21 pages.
Courbariaux et al., "BinaryConnect: Training Deep Neural Networks with binary weights during propagations", Advances in neural information processing systems, 2015, pp. 1-9.
Deng et al., "ImageNet: A Large-Scale Hierarchical Image Database", ImageNet Database, CVPR 2009, pp. 1-22.
GitHub., "Dilated Residual Networks", available online at <https://web.archive.org/web/20170914093903/https://github.com/fyu/drn>,Sep. 14, 2017, 4 pages.
Goodfellow et al., "Explaining and Harnessing Adversarial Examples", ICLR, Mar. 20, 2015, pp. 1-15.
Goodfellow et al., "Generative Adversarial Nets", Neural information processing Systems, Jun. 10, 2014, 9 pages.
Google Cloud, "Edge TPU", available online at <https://web.archive.org/web/20180725180221/https://cloud.google.com/edge-tpu/>, Jul. 25, 2018, 7 pages.
Guo et al., "Dynamic Network Surgery for Efficient DNNs", 30th Conference on Neural Information Processing Systems, 2016, pp. 1-9.
He et al., "Deep Residual Learning for Image Recognition", CVF, 2016, pp. 770-778.
HPE, "Delivering accelerated video analytics at the edge for AI Cities", Technical white paper, Mar. 2017, 13 pages.
Hubara et al., "Binarized Neural Networks", 30th Conference on Neural Information Processing Systems, 2016, 9 pages.
Hubara et al., "Quantized Neural Networks: Training Neural Networks with Low Precision Weights and Activations", Journal of Machine Learning Research, 2018, 30 pages.
Iandola et al., "Squeezenet: Alexnet-Level Accuracy With 50X Fewer Parameters and <0.5MB Model Size", ICLR 2017, Nov. 4, 2016, pp. 1-13.
Jiang et al., "An End-to-End Compression Framework Based on Convolutional Neural Networks", IEEE Transactions on Circuits and Systems for Video Technology, Aug. 2, 2017, pp. 1-13.
Johnson et al., "Perceptual Losses for Real-Time Style Transfer and Super-Resolution", European conference on computer vision, Mar. 27, 2016, pp. 1-18.
Krizhevsky et al., "ImageNet Classification with Deep Convolutional Neural Networks", Advances in neural information processing systems, 2012, 9 pages.
Kurakin et al., "Adversarial Examples in the Physical World", ICLR 2017, Nov. 4, 2016, pp. 1-14.
Ledig et al., "Photo-Realistic Single Image Super-Resolution Using a Generative Adversarial Network", CVF, 2017, pp. 4681-4690.
Li et al., "Ternary weight networks", 30th Conference on Neural Information Processing Systems (NIPS 2016), Nov. 19, 2016, pp. 1-5.
Liu et al., "Delving Into Transferable Adversarial Examples and Black-Box Attacks", ICLR 2017, Feb. 7, 2017, pp. 1-24.
Mentzer et al., "Conditional Probability Models for Deep Image Compression", CVF, 2018, pp. 4394-4402.
Microsoft Azure, "Azure IoT Edge", available online at < https://azure.microsoft.com/en-us/services/iot-edge/>, retrieved on Mar. 13, 2020, 15 pages.
NVIDIA, "Embedded Systems Developer Kits & Modules from NVIDIA Jetson",available online at < https://www.nvidia.com/en-us/autonomous-machines/embedded-systems/>, reterived on Mar. 13, 2020, 7 pages.
Rastegari et al., "XNOR-Net: ImageNet Classification Using Binary Convolutional Neural Networks", European Conference on Computer Vision. Springer, Aug. 2, 2016, pp. 1-17.
Simonyan et al., "Very Deep Convolutional Networks for Large-Scale Image Recognition", Nov. 18, 2014, pp. 1-12.
Su et al., "One Pixel Attack for Fooling Deep Neural Networks", IEEE Transactions on Evolutionary Computation, May 3, 2019, pp. 1-16.
Wallace et al., "The JPEG Still Picture Compression Standard", IEEE Transactions on Consumer Electronics, vol. 38(1), Feb. 1992, 17 pages.
Wu et al., "Machine Learning at Facebook: Understanding Inference at the Edge", In IEEE International Symposium on High Performance Computer Architecture, 2019, 15 pages.
Yosinski et al., "Understanding Neural Networks Through Deep Visualization", Deep Learning Workshop, 31st International Conference on Machine Learning, 2015, 12 pages.
Yu et al., "Dilated Residual Networks", Computer Vision and Pattern Recognition, May 28, 2017, pp. 1-9.
Yu et al., "Multi-Scale Context Aggregation by Dilated Convolutions", ICLR 2016, 2016, pp. 1-13.

(56) References Cited

OTHER PUBLICATIONS

Zhu et al., "Trained Ternary Quantization", Published as a conference paper at ICLR 2017, 2017, pp. 1-10.
Aksoy, B. et al., Attack Type Agnostic Perceptual Enhancement of Adversarial Images, (Research Paper), May 10, 2019, 6 Pgs.
RGB and YUV Color Space Conversion, (Web Page), Retrieved May 31, 2019, 3 Pgs.

\* cited by examiner

DEEP NEURAL NETWORK COLOR SPACE OPTIMIZATION

BACKGROUND

Computer vision based on deep neural networks (DNN) has lots of potential in the Internet of Things (IoT) regime with promising applications, such as object classification for a solar-powered wireless camera and/or object segmentation for a city-scale public-safety drone, etc. However, running DNN applications on IoT devices remains challenging due to the limited computing power, storage space, and/or battery life of the IoT devices. With the 5G network that features mobile edge computing, it is possible to offload inference tasks to powerful edge nodes. Thus, IoT devices can stream the captured video and/or image source to remote edge servers, which can then perform the compute-intensive DNN inference and respond with the results.

DNN-based inference at the edge has recently become a new frontier of deep learning research. However, considering the growing number of connected IoT devices, limited wireless bandwidth is becoming a fundamental challenge, hindering the deployment of the edge inference for DNN-based applications. Human retina has three types of color-sensitive cone cells to detect—namely, red, green, and blue colors. Therefore, cameras and display devices typically follow a RGB color model, where the color information is carried by the R, G and B channels. The RGB color model is an additive color model in which red, green, and blue light are added together in various ways to reproduce a broad array of colors. In the RGB color space, all three channels carry critical information, making it difficult to compress the RGB images and/or videos. To enable a more aggressive compression than RGB, an alternative YUV color space may be used. The YUV color model concentrates most information to one channel (e.g., Y channel) so that the other two channels (e.g., U and V channels) can be compressed substantially with compression artifacts masked by the human perception. However, conventional RGB and YUV color spaces do not take into consideration the color perception of the DNNs. Thus, both existing RGB and YUV color models are unsuitable for the DNNs.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following detailed description references the drawings, wherein.

DETAILED DESCRIPTION

Neural networks generally refer to a set of algorithms, modeled after the human brain, that are designed to recognize patterns. They interpret sensory data through machine perception, labeling or clustering raw inputs. The patterns they recognize are numerical, contained in vectors, into which all real-world data, such as images, sound, text or time series, can be translated. Deep neural networks (DNNs) are neural networks involving a large number of layers.

IoT and deep-learning-based computer vision together create an immense market opportunity, but running deep neural networks (DNNs) on resource-constrained IoT devices remains challenging. Offloading DNN inference to an edge server is promising. However, limited wireless bandwidth bottlenecks its end-to-end performance and scalability. While IoT devices can adopt source compression to cope with the limited bandwidth, existing compression algorithms or codecs are often designed for the human vision system (HVS) rather than the DNNs, and thus suffer from either low compression ratios or high DNN inference errors.

This disclosure describes G-YUV (Gradient-driven YUV), an enhanced variant of the YUV color space, to facilitate the color image and/or video compression for the cloud or edge DNN inference. Given a target DNN model already trained with RGB images, G-YUV can analyze this DNN's perceptual sensitivity with regard to the red, green and blue colors based on a small number of probing images. It then leverages this estimated color sensitivity to design a set of optimal RGB-to-YUV conversion weights which concentrate most information to a single channel (Y) and minimize the DNN's sensitivity to the other two channels (U and V). In this way, G-YUV allows the codec to compress the U and V signals more aggressively without compromising the DNN inference accuracy.

In some examples, when the disclosed technique can be applied to the most popular image codec Joint Photographic Experts Group (JPEG), the evaluation results demonstrate its superior compression performance over existing strategies for key DNN applications. When the proposed G-YUV is applied on the most popular image codec JPEG, and the described technique demonstrates its superior compression performance over conventional RGB and YUV color spaces. For semantic segmentation, the disclosed technique can reduce the image size by 22% compared to using conventional YUV color model and 36% compared to using conventional RGB color model. In the same experiment, the disclosed technique also achieves a 0.08% higher accuracy than YUV and 0.57% higher accuracy than RGB. Similarly, the disclosed technique can be widely used in compressing other image and/or video format such as H.264/MPEG-4 Advanced Video Coding (MPEG-4 AVC).

Figure 1:
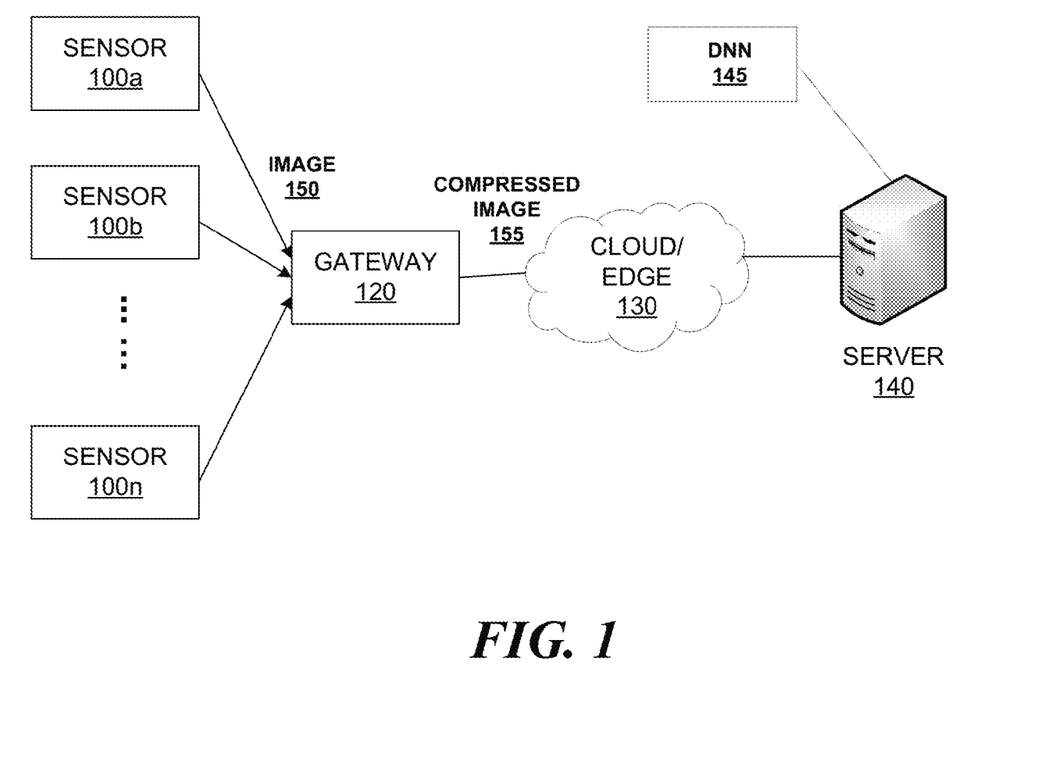
FIG. 1 illustrates an example computing environment for deep neural network color space optimization in accordance with the present disclosure.

FIG. 1 illustrates an example computing environment for deep neural network color space optimization. FIG. 1 includes a plurality of IoT devices, such as sensor 100a to sensor 100n, that are connected to a gateway device 120 deployed at the edge. The gateway device 120 may be communicatively coupled to at least a remote server 140 on cloud 130. For example, remote server 140 may be deployed at a data center on cloud or edge 130. The plurality of IoT devices (e.g., sensors 100a to 100n) may transmit their captured images 500 to gateway device 120. To reduce the uplink bandwidth requirement of gateway device 120, gateway device 120 may compress the received images 150 locally at the edge, and then transmit the compressed images 155 to the remote server 140 on cloud or edge 130. Server 140 can run a DNN 145 that analyzes the plurality of compressed images 155 received from gateway device 120.

Lossless image formats, such as BMP and PNG, have a too low compression ratio by natural, which hampers the scalability of edge inference architecture. In other words, those lossless image formats make it difficult for gateway device 120 to transmit a large quantity of images to server 140 for further processing. The G-YUV color space disclosed herein can be used with GRACE (GRAdient-driven Compression for Edge), a novel DNN-aware compression technique to facilitate the edge inference, to achieve color image and/or video compression optimized for a target DNN.

Figure 2:
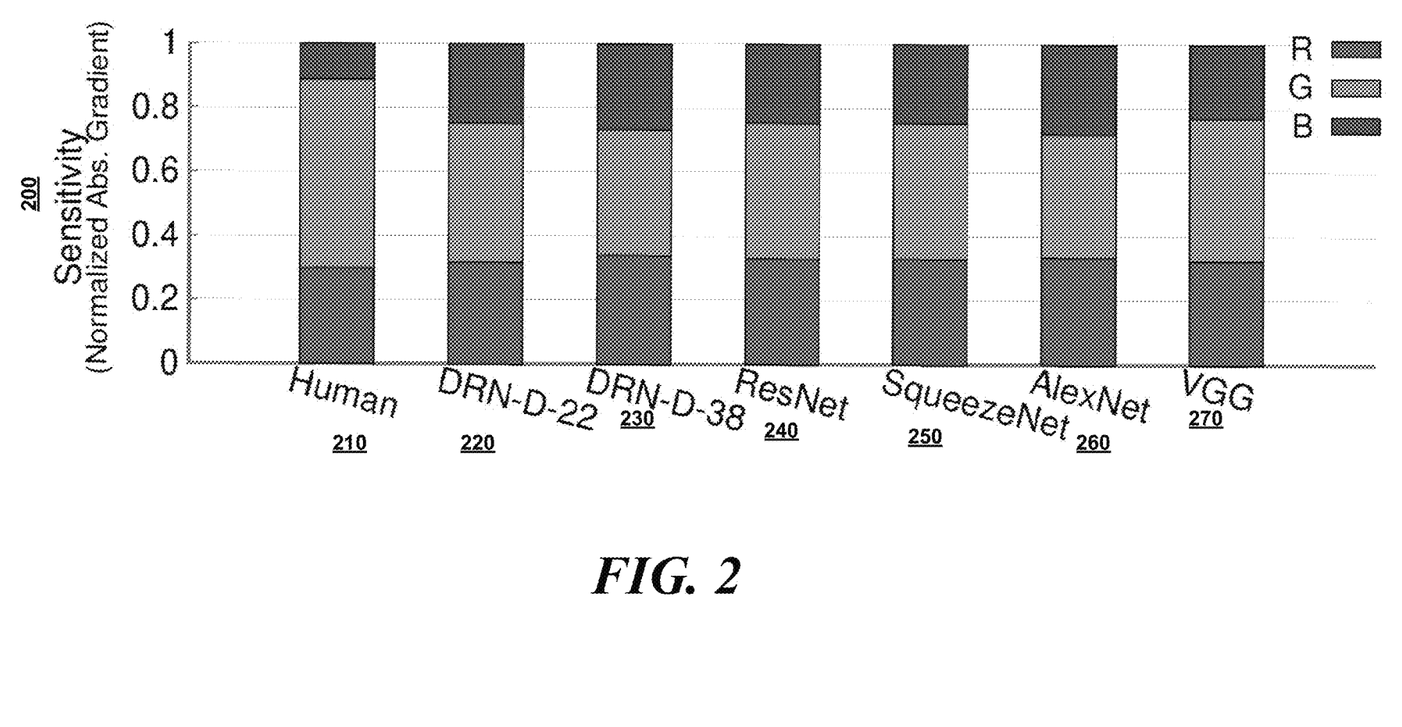
FIG. 2 illustrates color sensitivities of six different DNN models compared to human vision system according to the present disclosure.

Most images and videos are captured by color cameras. Existing JPEG and MPEG codecs generally leverage the color perception of human vision system (HVS) to compress color images or videos. However, the DNNs and human eyes have different sensitivity to the RGB colors. Specifically, the y-axis of FIG. 2 indicates the color sensitivity 200, as normalized absolute gradient, of human vision system (e.g., human 210) versus each different kind of DNNs, such as DRN-D-22 220, DRN-D-38 230, ResNet 240, SqueezeNet 250, AlexNet 260, VGG 270, etc. The length of red, green, and blue colored bars indicates the sensitivity to such colors by the respective system. Hence, as shown in FIG. 2, human eyes are more sensitive to the green color components in an image or video than the various DNNs and less sensitive to blue color components in the image or video than the various DNNs.

Alternatively, the YUV color model is adopted by popular codecs like JPEG and H.264. The YUV color space consists of one luminance (brightness) channel Y and two chrominance channels U & V. Following the human perception model, conversion from RGB to YUV redistributes the information across the 3 channels so that the eyes have much finer sensitivity to the resulting Y channel than the U & V channels. In this way, the signal on U & V channels can be compressed aggressively.

Let $R \in [0, 1]$, $G \in [0, 1]$, and $B \in [0, 1]$ denote the value of a pixel in an RGB image, while Y, U, and V denote the corresponding YUV pixel values. The conversion from RGB to YUV can be calculated according to equations (1)-(3) below:

$$Y = W_R R + W_G G + W_B B \qquad (1)$$

$$U = \frac{1}{2} * \frac{B - Y}{1 - W_B} \qquad (2)$$

$$V = \frac{1}{2} * \frac{R - Y}{1 - W_R} \qquad (3)$$

The luminance signal (Y) is the weighted sum of the R, G and B signals, which is essentially a greyscale image with no color information. The weights $W_R$, $W_G$ and $W_B$ are conventionally engineered following the color sensitivity of human eyes. For example, in CCIR.601 standard, $W_R$ is 0.299, $W_G$ is 0.587, and $W_B$ is 0.114.

In one example, when the pixel is saturated green, its RGB value is (0, 1, 0) and the perceived brightness Y is $W_G$ (valued at 0.587), while the perceived brightness is $W_B$ (valued at 0.114) for a saturated blue pixel with RGB value (0, 0, 1). In other words, for the green and blue pixels of equal power, human eyes perceive the green pixel as brighter, and the weights capture such perceived brightness of certain color. The conversion from RGB to YUV should not change the power of the pixel. Thus, equation (4) bounds the weights $W_R$, $W_G$, and $W_B$:

$$W_R + W_G + W_B = 1 \qquad (4)$$

Further, the resulting Y range is [0, 1]. The physical meaning of the U & V channels is the color difference (scaled to the range [−0.5, 0.5]). U is the blue-difference and V is the red difference, i.e., When the U & V signals are all 0, the color image reduces to a greyscale image. Due to human eyes' low acuity for the U & V signals, they can be compressed aggressively with little human perception loss.

Since a typical DNN takes RGB image as an input, the system can obtain the gradient $g_R$, $g_G$ and $g_B$ with regard to the R, G and B channels. Then, for each channel, the system can sum the gradients amplitude over all frequency coefficients as our measure of the DNN's sensitivity to the R, G and B colors. Thus, the color sensitivity of DNN and human eyes can be compared in this way. FIG. 2 illustrates color sensitivities of six different DNN models compared to human vision system. The color sensitivity of the human vision system is derived from CCIR.601. That is 0.299 for red, 0.587 for green, and 0.114 for blue. As seen in FIG. 2, different color sensitivities exist between the DNNs and human eyes, e.g., all target DNNs show better acuity than human eyes on the blue channel, because human eyes have fewer blue-sensing cone cells while computer vision has no such limitation. In addition, different color sensitivities are shown across various DNN models, which necessitates the color space customization when targeting a specific DNN.

The YUV color space concentrates the sensitive information to the Y channel thus the U and V signals can be compressed aggressively. From the perspective of the gradient, a YUV-formatted dataset is fed to the target DNN (e.g., DRN-D-22) and the gradient with respect to the Y, U and V channels is measured.

Figure 3A:
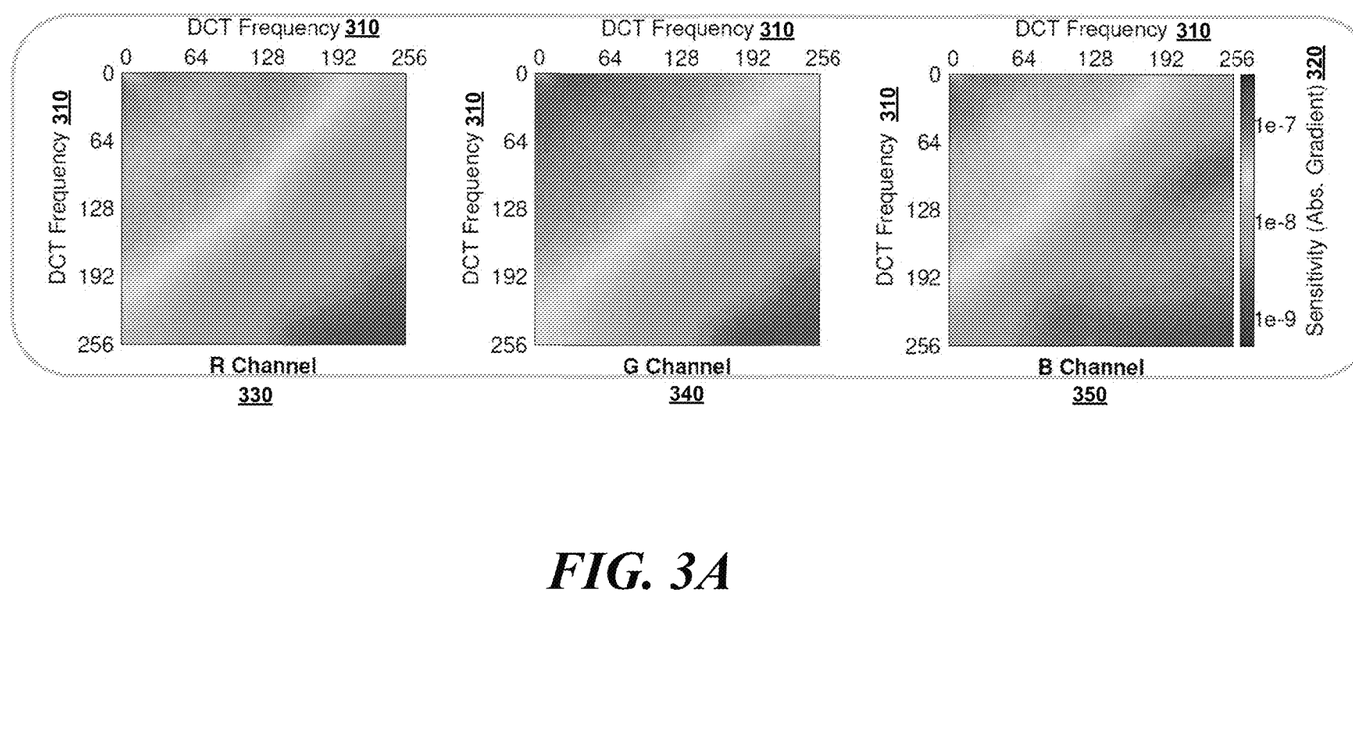
FIG. 3A illustrates the amplitude of gradient with respect to the R, G, and B color channels according to the present disclosure.

FIG. 3A illustrates the amplitude of gradient with respect to the R, G, and B color channels. Specifically, FIG. 3A includes the amplitude of gradient as represented by DCT frequencies 310 in the R channel 330; the amplitude of gradient as represented by DCT frequencies 310 in the G channel 340; and the amplitude of gradient as represented by DCT frequencies 310 in the B channel 350. The sensitivity level 320 is represented by different colors. For example, the red color represents image and/or video components that are highly sensitive to a particular color channel, whereas the blue color represents image and/or video components that are less sensitive to the particular color channel. As seen in FIG. 3A, the R, G, and B color channels include approximately the same amount of highly sensitive information (as represented by the red colored components in the upper left corners). This makes it difficult to compress either R, G, or B channel.

Figure 3B:
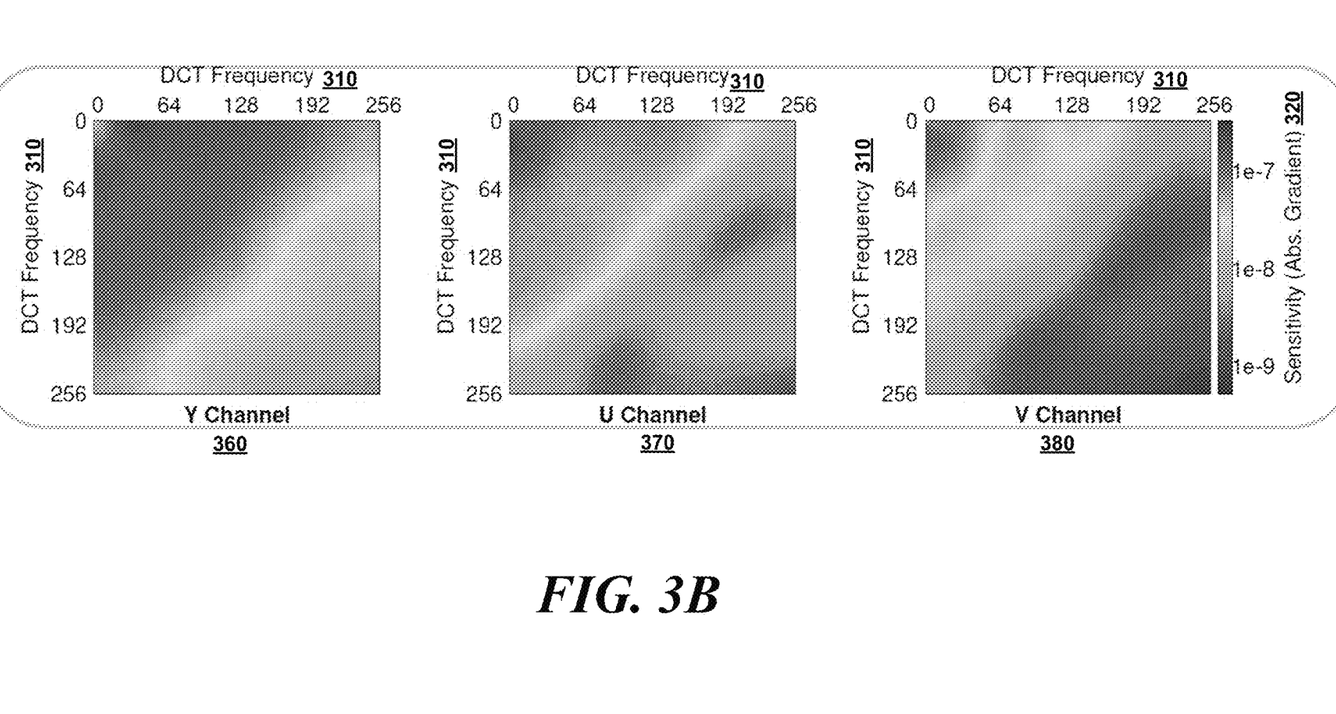
FIG. 3B illustrates the amplitude of gradient with respect to the Y, U and V channels after the RGB image or video is converted to the YUV color space according to the present disclosure.

On the other hand, FIG. 3B illustrates the amplitude of gradient with respect to the Y, U and V channels after the same RGB image or video is converted to the YUV color space. Similar to the RGB color model illustrated in FIG. 3A, FIG. 3B includes the amplitude of gradient as represented by DCT frequencies 310 in the Y channel 360; the amplitude of gradient as represented by DCT frequencies 310 in the U channel 370; and the amplitude of gradient as represented by DCT frequencies 310 in the V channel 380. The sensitivity level 320 is represented by different colors. That is, the red color represents image and/or video components that are highly sensitive to a particular color channel, whereas the blue color represents image and/or video components that are less sensitive to the particular color channel.

As shown in FIG. 3B, the amplitude of gradient with respect to the Y channel is higher than U and V channels, which reveals how the RGB-to-YUV conversion is able to concentrate the sensitivity information to a single channel, e.g., the Y channel. However, since the conversion weights $W_R$, $W_G$, and $W_B$ are designed for human eyes rather than DNNs, some sensitive information still can be seen in the U channel in FIG. 3B.

According to the present disclosure, such conversion weights can be further customized for the target DNN to allow the U and V channels to be compressed more efficiently. However, the weights $W_R$, $W_G$, and $W_B$ in equations (1)-(3) uniquely define the RGB-to-YUV conversion are designed for human eyes, thus is not desirable when compressing for the DNNs with very different color perception than human eyes.

Therefore, the disclose technique can be used to calculate an optimal conversion weights for a target DNN, which allows the codec to compress the U and V signals without compromising the inference accuracy of the target DNN. Specifically, the disclosed solution uses the gradient inputs to characterize the DNN's perceptual sensitivity.

According to some examples, let $$g_Y = \frac{\partial L}{\partial Y}, \quad (5)$$

$$g_U = \frac{\partial L}{\partial U}, \text{ and} \quad (6)$$

$$g_V = \frac{\partial L}{\partial V} \quad (7)$$

denote the gradients with respect to the Y, U and V values of a certain DCT frequency coefficient. To guarantee the DNN accuracy in the worst cases where the DNN loss increments caused by the compression artifacts on all pixels add up, such optimization can be formulate as minimizing the sum of the gradient amplitudes with respect to the U channel $\Sigma_{i=1}^{N} \|g_U^i\|$ and that with respect to the V channel $\Sigma_{i=1}^{N} \|g_V^i\|$.

Given a target DNN, the optimal weights $W_R$, $W_G$, and $W_B$ of the RGB-to-YUV conversion that minimizes $\Sigma_{i=1}^{N} \|g_U^i\|$ and $\Sigma_{i=1}^{N} \|g_V^i\|$ are described in equations (8)-(10) below:

$$W_R = z_2/(1+z_1+z_2) \quad (8)$$

$$W_G = 1/(1+z_1+z_2) \quad (9)$$

$$W_B = z_1/(1+z_1+z_2) \quad (10)$$

where $z_1 = (\widetilde{g_B/g_G})$ and $z_2 = (\widetilde{g_R/g_G})$, and where $$g_R = \frac{\partial L}{\partial R}, g_G = \frac{\partial L}{\partial G}, \text{ and } g_B = \frac{\partial L}{\partial B}$$

are the DNN's gradient with respect to spatial frequencies on the R, G, and B channel respectively. Here, the tilde stands for median over all frequency coefficients of all probing images.

Figure 4A:
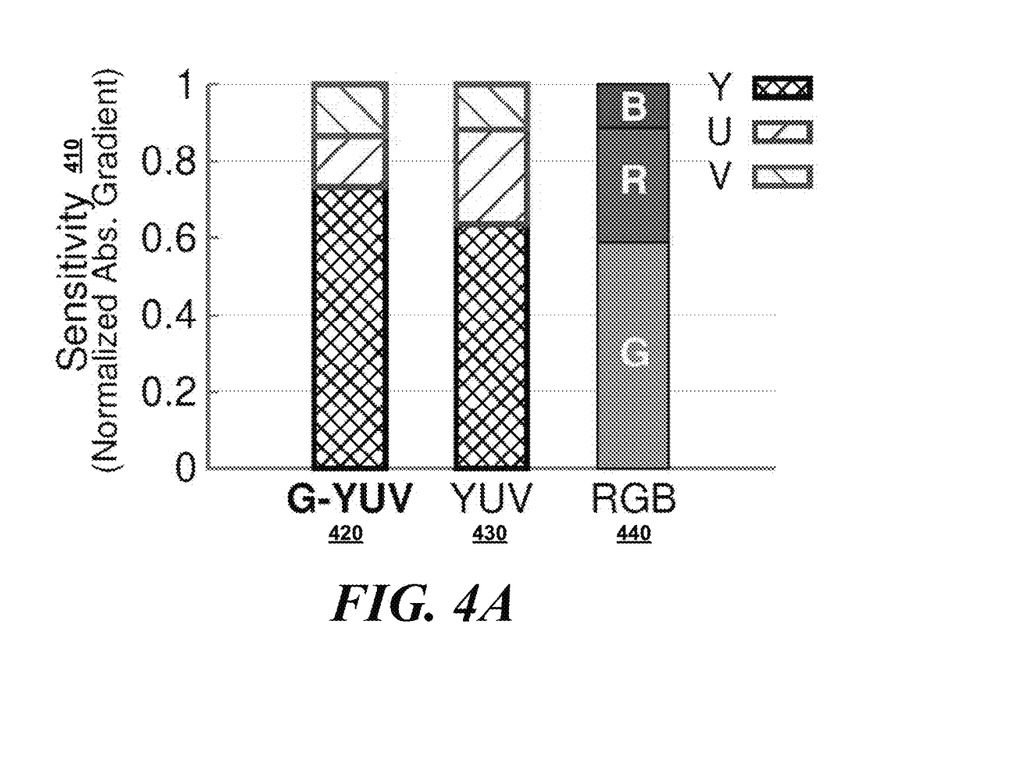
FIGS. 4A-4B illustrate effectiveness of Gradient Driven YUV (G-YUV) as tested on example target DNNs according to the present disclosure.
Figure 4B:
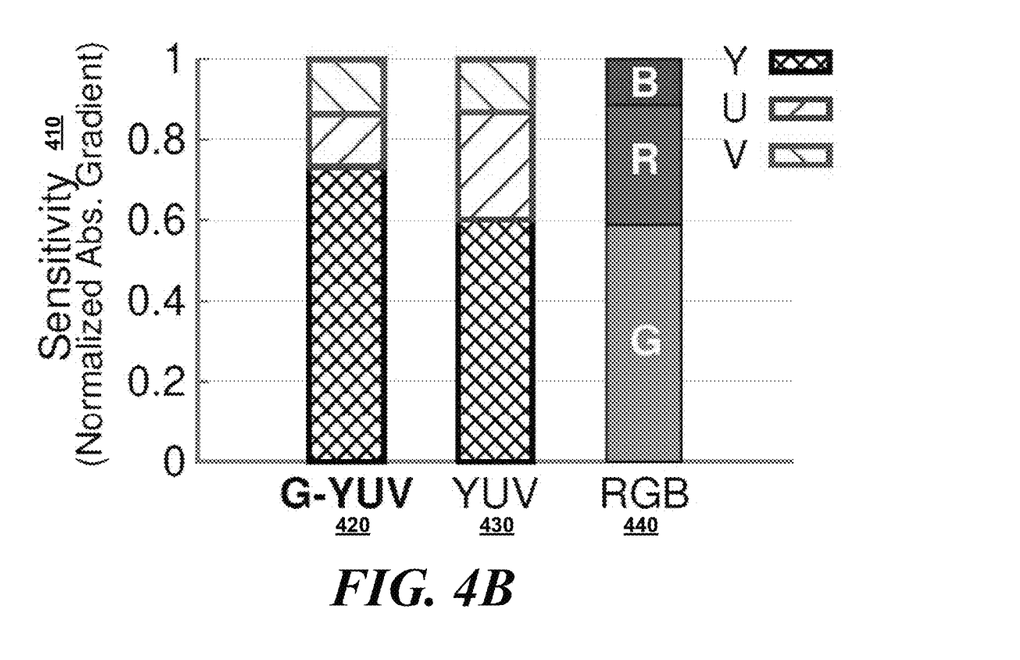

Since the optimal weights following equations (8)-(10) are computed based on the gradients, the enhanced color space model employed by the disclosed system is called color space gradient-driven YUV (G-YUV). To validate G-YUV, the system further checks whether it has more concentrated sensitivity pattern across the Y, U and V channels than conventional YUV or the RGB color space. FIG. 4A illustrates the effectiveness of G-YUV tested on a first target DNN (i.e., DRN-D-22). Furthermore, FIG. 4B illustrates the effectiveness of G-YUV tested on a second target DNN (i.e., DRN-D-38). In FIGS. 4A-4B, the y-axis indicates the color sensitivity 410 as normalized absolute gradient; and the x-axis indicates the different color models used for comparison (e.g., G-YUV 420, conventional YUV 430, and conventional RGB 440). The length of different color patterned bar indicates the amount of sensitive information concentrated to each of the Y, U, V (or R, G, B) channels respectively. Compared to the conventional YUV color model and/or the conventional RGB color model, the G-YUV is able to concentrate more sensitive information on the Y channel while further suppressing the importance of the U and V channels.

Figure 5:
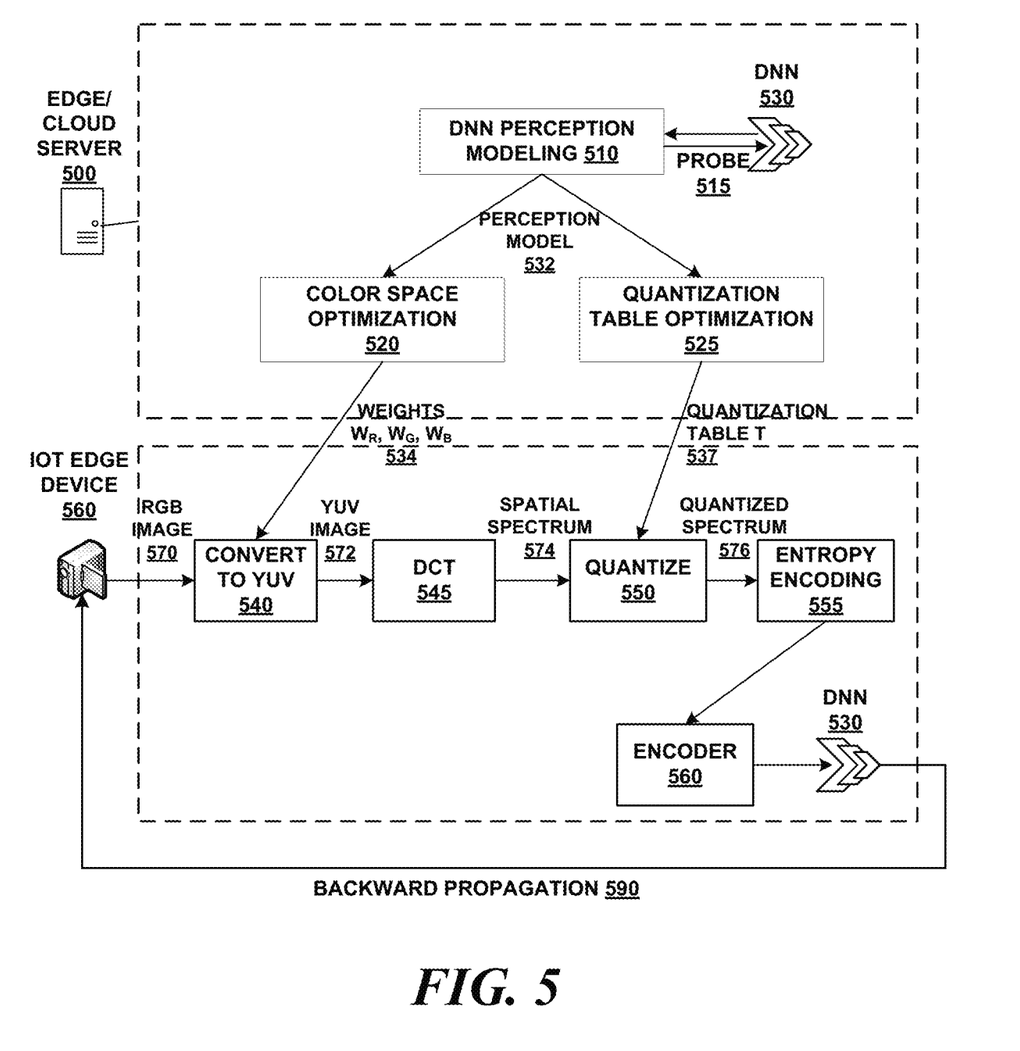
FIG. 5 illustrates an example system for deep neural network color space optimization according to the present disclosure.

FIG. 5 illustrates an example system for deep neural network color space optimization. The disclosed system involves a two-phase training process. The first phase involves offline training performed at a server 500 that can be deployed at either the edge or the cloud. During this phase, the system first performs DNN perception modeling 510 via a series of probes 515 to a target DNN 530. The probes 515 are performed offline prior to performing any real-time image compression on images received at the edge gateway device. To probe the target DNN 530, the system uses a small number (e.g., 15) of RGB images to probe the DNN's sensitivity to the R, G and B colors. The result from the probes 515 is the gradients $g_R$, $g_G$ and $g_B$ of the DNN loss with respect to all pixels in each color channel.

Based on the target DNN's response to probe 515, the system can use backward propagation technique to derive a DNN perception model 532. After applying backward propagation 590 to the DCT frequency domain for the target DNN 530, the system can obtain the importance level of different components of the image to the final result of image compression. Compressing a component of the image associated with a high importance level would reduce the DNN inference accuracy, whereas compressing a component of the image associated with a low importance level would not affect the DNN inference accuracy. In one example, the system uses a collection of approximately 15 images to probe the target DNN 530 to balance the accuracy and computing resource consumption.

Next, the system performs color space optimization 520 and quantization table optimization 525. In particular, during color space optimization 520, given the target DNN's perception model 532, the optimization of the RGB-to-YUV conversion weights $W_R$, $W_G$, and $W_B$ 534 for G-YUV color space can be summarized as the following two steps: First, the system computes the optimal RGB-to-YUV conversion weights based on the DNNs color sensitivity.

Given the target DNN 530, the optimized RGB-to-YUV conversion weights can be estimated in a remote server on the cloud or at the edge, and the server can then send the calculated weights to the client that configures the codec. The rationale for using gradient is: the gradient with respect to an input pixel characterizes how much the DNN accuracy would change given a small perturbation applied to this pixel. For instance, if the gradient with respect to a pixel in the green channel has a higher amplitude than that of the blue channel, a perturbation in the green channel causes more DNN accuracy change than that in the blue channel. In other words, the DNN is more sensitive to the green color.

Then, the system computes the optimal RGB-to-YUV conversion weights so that the target DNN is least sensitive to the resulting U and V signals, where the sensitivity is also characterized by the gradients $g_Y$, $g_U$, and $g_V$ with respect to the pixels of the Y, U and V channels. To guarantee the DNN accuracy in the worst cases where the loss caused by the compression add up for all pixels, the system attempts to minimize the sum of the gradient amplitudes with respect to all N pixels on the U channel and the V channel.

Subsequently, the system sets the RGB-to-YUV conversion weights in the codec to the optimal ones. G-YUV is a variant of YUV color space with the parameters optimized for DNNs rather than the human vision system. It is compatible with any existing codec that supports the conventional YUV color space. By setting the RGB-to-YUV conversion weights to the ones optimized for the target DNN, the codec can then compress the input for the target DNN.

During quantization table optimization 525, the resulting DCT frequency domain sensitivity map derived from the backward propagation can be used to derive the quantization table T 537 by computing the gradient of DNN loss with respect to every DCT coefficient. In the quantization table T 537 derived for the target DNN 515, the high sensitivity DCT frequency components correspond to a small quantization size in the quantization table. On the other hand, a low sensitivity DCT frequency components correspond to a large quantization size in the quantization table. The quantization size correlate to the amount of noise to be added to an image prior to compression. When the quantization size is small, less noise is added to the corresponding image component, resulting in less distortion after image compression. When the quantization size is large, more noise is added to the corresponding image component, resulting in more distortion after image compression. The derived quantization table specific to the target DNN is then used as optimization metrics for image compression for the target DNN, deployed to IoT devices (e.g., sensors at the edge) via the gateway device at the edge, and used for real-time image compression during the second phase.

Both of the color space optimization and the quantization table optimization described above are executed offline before the actual image/video compression, and thus adding no extra online running overhead of the system.

After offline optimization for the color space, the second phase of the image compression architecture is online compression. With the optimized RGB-to-YUV conversion weights $W_R$, $W_G$, and $W_B$ 534, as well as the optimized quantization table T 537 received from the edge or cloud server 500, the IoT device 560 performs the online compression of the DNN inputs before streaming them to the edge server. The image compression reuses the existing JPEG image encoder framework and sets the conversion weights and quantization table to the ones optimized for the target DNN.

During this second phase, RGB images (or videos) 570 of n×n pixels are sent from IoT devices 560 as input to a conversion module 540 to convert to YUV color space and generates YUV images 572. DCT module 545 decomposes of the n×n unique two-dimensional spatial frequencies, which comprise the input signal's spectrum. The output of the DCT is the spatial spectrum comprising a set of n×n basis-signal amplitudes (also referred to as DCT coefficients).

To achieve compression, each DCT coefficient is uniformly quantized at a quantize module 550 in conjunction with an n×n size quantization table T 537. Quatization is defined as division of each DCT coefficient by its corresponding quantizer step size, followed by rounding to the nearest integer, and then the output is normalized by the quantizer step size. Rather than using a fixed JPEG quantization table, the system uses the deployed quantization table 538, which is derived from the offline training process and optimized for the target DNN 530. The quantize module 550 produces a plurality of quantized spectrum 576 that are sent to an entropy encoding module 555. Note that the disclosed system reuses the same compression framework as JPEG compression framework with a different and optimized quantization table to achieve good compatibility.

Next, the entropy encoding module 555 performs entropy coding. In general, entropy encoding can be performed as a 2-step process. The first step converts the zig-zag sequence of quantized coefficients into an intermediate sequence of symbols. The second step converts the symbols to a data stream in which the symbols no longer have externally identifiable boundaries. The form and definition of the intermediate symbols is dependent on both the DCT-based mode of operation and the entropy coding method.

The entropy encoding module 550 can produce the compressed images, which are transmitted to an edge server (e.g., the gateway device). The edge server can use a standard decoder 560 to decode the compressed image and perform DNN inference at edge server. Here, the edge server runs an instance of target DNN 530 that the color conversion weights 534 and the quantization table T 537 are optimized for. The edge server can then send the DNN inference results to the IoT device 560 that is performing online encoding at the edge. In some examples, the server running the instance of DNN 530 can be deployed on the cloud rather than at the edge.

The disclosed system provides a variety of benefits. First, it provides higher compression ratio and DNN inference accuracy, because it concentrates more of the critical information to a single channel (Y) than the conventional YUV color space. Therefore, the other two channels (U & V) can be compressed substantially, leading to a higher compression ratio. Meanwhile, the bandwidth saving on the U & V channels allows less aggressive compression on the Y channel, which protects the critical information on the Y channel, leading to a higher DNN inference accuracy.

Second, the system has unchanged running overhead, because it can estimate the target DNN's color sensitivity and optimize the RGB-to-YUV conversion weights in an offline process. Such offline process is executed in advance on a remote server such that the online compression reuses existing codec framework with the optimal RGB-to-YUV conversion weights, adding no extra computation overhead.

Third, the system is backward compatible. Specifically, the disclosed system is compatible with any existing image and video codecs that support the YUV color space. It just changes the RGB-to-YUV conversion weights to the ones optimized for the target DNN.

Figure 6:
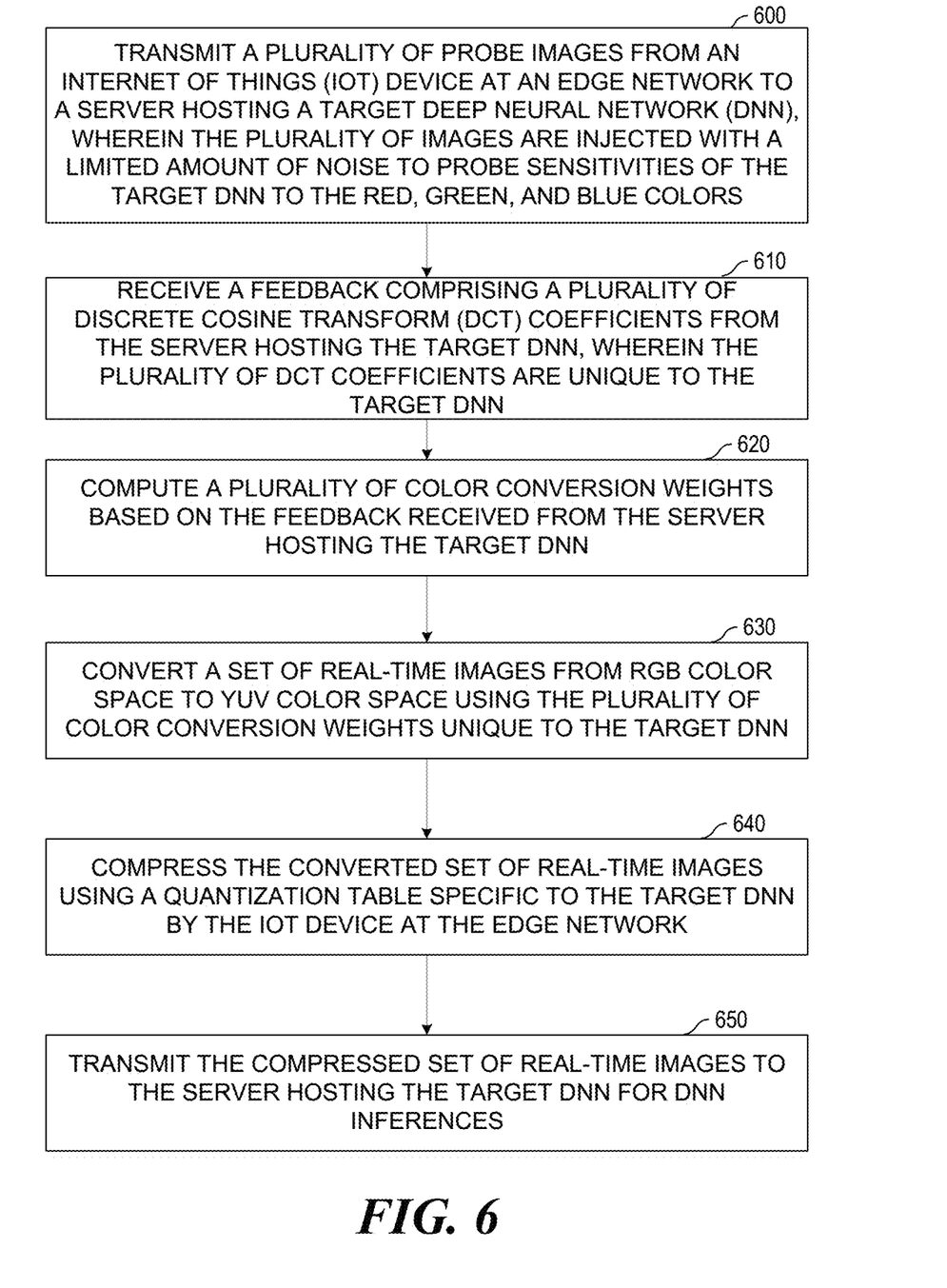
FIG. 6 is an example process of deep neural network color space optimization according to the present disclosure.

FIG. 6 is an example process of deep neural network color space optimization according to the present disclosure. During operations, a network device may transmit a plurality of probe images from an Internet of Things (IoT) device at an edge network to a server hosting a target deep neural network (DNN) (operation 600). The plurality of images may be injected with a limited amount of noise to probe sensitivities of the target DNN to the red, green, and blue colors. Next, the network device may receive a feedback comprising a plurality of discrete cosine transform (DCT) coefficients from the server hosting the target DNN (operation 610). Note that the plurality of DCT coefficients are unique to the target DNN. Further, the network device can compute a plurality of color conversion weights based on the feedback received from the server hosting the target DNN (operation 620). Then, the network device may convert a set of real-time images from RGB color space to YUV color space using the plurality of color conversion weights unique to the target DNN (operation 630). Moreover, the network device may compress the converted set of real-time images using a quantization table specific to the target DNN by the IoT device at the edge network (operation 640). Last but not least, the network device can transmit the compressed set of real-time images to the server hosting the target DNN for DNN inferences (operation 650).

In some examples, the network device may further estimate the gradient of loss with respect to each color sensitivity by performing backward propagation of color sensitivity gradients corresponding to the R, G, and B channels. The plurality of color conversion weights may include a first weight $W_R$, a second weight $W_G$, and a third weight $W_B$ corresponding to R, G, and B channels in RGB color space respectively. Here, the first weight $W_R$ may be calculated as (1) a second ratio divided by (2) a sum of a first ratio, the second ratio, and 1, wherein the first ratio comprises a ratio of blue gradient over green gradient, and wherein the second ratio comprises a median ratio of red gradient over green gradient. The second weight Wo may be calculated as 1 divided by a sum of a first ratio, the second ratio, and 1, wherein the first ratio comprises a ratio of blue gradient over green gradient, and wherein the second ratio comprises a median ratio of red gradient over green gradient. The third weight $W_R$ may be calculated as (1) a first second ratio divided by (2) a sum of the first ratio, a second ratio, and 1, wherein the first ratio comprises a ratio of blue gradient over green gradient, and wherein the second ratio comprises a median ratio of red gradient over green gradient.

In some examples, the first ratio and the second ratio are both median ratio across all RGB pixels of the plurality of probe images.

In some examples, computing a plurality of color conversion weights based on the feedback received from the server hosting the target DNN is performed via an offline process without adding overhead to real-time image compression process.

In some examples, the network device can further apply DCT on a live YUV image converted from a live RGB image using the plurality of color conversion weights by the IoT device to generate a plurality of spatial spectrum. Then, the network device can use a quantization table unique to the target DNN to generate quantized spectrum. Next, the network device can perform entropy coding on the quantized spectrum to produce compressed image that are color sensitive to the target DNN.

In some examples, the plurality of DCT coefficient may indicate the DCT frequency domain sensitivity corresponding to the target DNN.

In some examples, the network device may convert the plurality of probe images from a spatial domain to a frequency domain prior to transmitting the plurality of probe images from the IoT device to the server hosting the target DNN.

Figure 7:
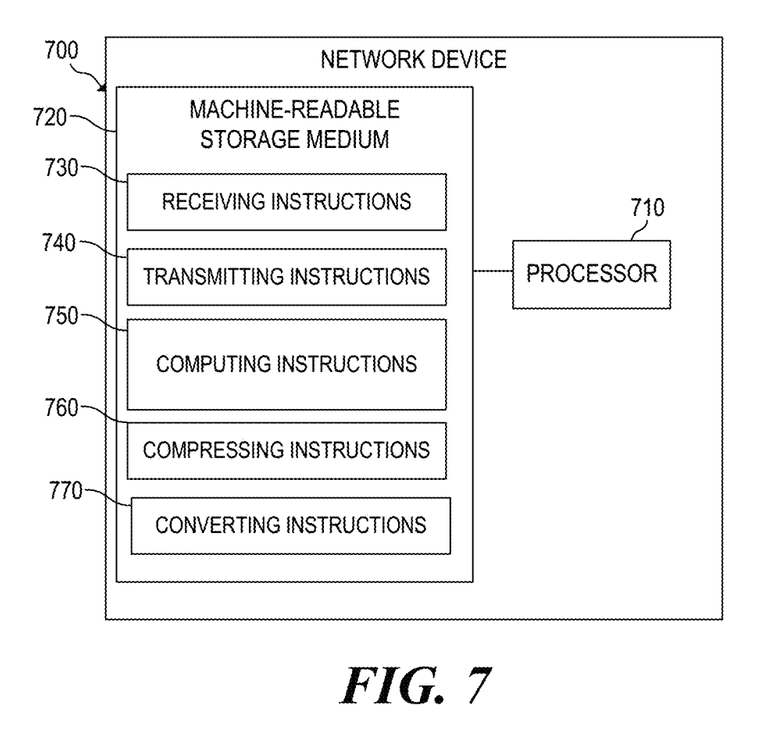
FIG. 7 is a block diagram of an example network device to perform deep neural network color space optimization according to the present disclosure.

FIG. 7 is a block diagram of an example network device to perform deep neural network color space optimization according to the present disclosure.

As used herein, a network device may be implemented, at least in part, by a combination of hardware and programming. For example, the hardware may comprise at least one processor (e.g., processor 710 which may include one main processor and a plurality of co-processors) and the programming may comprise instructions, executable by the processor(s), stored on at least one machine-readable storage medium (e.g., 720). In addition, a network device may also include embedded memory and a software that can be executed in a host system and serve as a driver of the embedded memory. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof.

The at least one processor 710 may fetch, decode, and execute instructions stored on storage medium 720 to perform the functionalities described below in relation to receiving instructions 730, transmitting instructions 740, computing instructions 750, compressing instructions 760, and converting instructions 770. In other examples, the functionalities of any of the instructions of storage medium 720 may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the example of FIG. 7, storage medium 720 may be implemented by one machine-readable storage medium, or multiple machine-readable storage media.

Although network device 700 includes at least one processor 710 and machine-readable storage medium 720, it may also include other suitable components, such as additional processing component(s) (e.g., processor(s), ASIC(s), etc.), storage (e.g., storage drive(s), etc.), or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive; any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

Specifically, instructions 730-770 may be executed by processor 710 to: transmit a plurality of probe images from an IoT device at an edge network to a server hosting a target DNN, wherein the plurality of images are injected with a limited amount of noise to probe sensitivities of the target DNN to the red, green, and blue colors; receive a feedback comprising a plurality of DCT coefficients from the server hosting the target DNN, wherein the plurality of DCT coefficients are unique to the target DNN; compute a plurality of color conversion weights based on the feedback received from the server hosting the target DNN; convert a set of real-time images from RGB color space to YUV color space using the plurality of color conversion weights unique to the target DNN; compress the converted set of real-time images using a quantization table specific to the target DNN by the IoT device at the edge network; transmit the compressed set of real-time images to the server hosting the target DNN for DNN inferences; estimate the gradient of loss with respect to each color sensitivity by performing backward propagation of color ensitivity gradients corresponding to the R, G, and B channels; apply DCT on a live YUV image converted from a live RGB image using the plurality of color conversion weights by the IoT device to generate a plurality of spatial spectrum; use a quantization table unique to the target DNN to generate quantized spectrum; perform entropy coding on the quantized spectrum to produce compressed image that are color sensitive to the target DNN; etc.

We claim:

1. A method comprising:
   transmitting a plurality of probe images from an Internet of Things (IoT) device at an edge network to a server hosting a target deep neural network (DNN), wherein the plurality of images are injected with a limited amount of noise to probe sensitivities of the target DNN to red, green, and blue colors;
   receiving a feedback comprising a plurality of discrete cosine transform (DCT) coefficients from the server hosting the target DNN, wherein the plurality of DCT coefficients are unique to the target DNN;
   computing a plurality of color conversion weights based on the feedback received from the server hosting the target DNN;
   converting a set of real-time images from RGB color space to YUV color space using the plurality of color conversion weights unique to the target DNN;
   compressing the converted set of real-time images using a quantization table specific to the target DNN by the IoT device at the edge network; and
   transmitting the compressed set of real-time images to the server hosting the target DNN for DNN inferences.

2. The method of claim 1, further comprising:
   estimating a gradient of loss with respect to each color sensitivity by performing backward propagation of color sensitivity gradients corresponding to R, G, and B channels.

3. The method of claim 1, wherein the plurality of color conversion weights comprise a first weight $W_R$, a second weight $W_G$, and a third weight $W_B$ corresponding to R, G, and B channels in RGB color space respectively.

4. The method of claim 3, wherein the first weight $W_R$ is calculated as (1) a second ratio divided by (2) a sum of a first ratio, the second ratio, and 1, wherein the first ratio comprises a ratio of blue gradient over green gradient, and wherein the second ratio comprises a median ratio of red gradient over green gradient.

5. The method of claim 3, wherein the second weight $W_G$ is calculated as 1 divided by a sum of a first ratio, a second ratio, and 1, wherein the first ratio comprises a ratio of blue gradient over green gradient, and wherein the second ratio comprises a median ratio of red gradient over green gradient.

6. The method of claim 3, wherein the third weight $W_B$ is calculated as (1) a first ratio divided by (2) a sum of the first ratio, a second ratio, and 1, wherein the first ratio comprises a ratio of blue gradient over green gradient, and wherein the second ratio comprises a median ratio of red gradient over green gradient.

7. The method of claim 4, wherein the first ratio and the second ratio are both median ratio across all RGB pixels of the plurality of images.

8. The method of claim 1, wherein computing a plurality of color conversion weights based on the feedback received from the server hosting the target DNN is performed via an offline process without adding overhead to real-time image compression process.

9. The method of claim 1, further comprising:
   applying DCT on a live YUV image converted from a live RGB image using the plurality of color conversion weights by the IoT device to generate a plurality of spatial spectrum;
   using a quantization table unique to the target DNN to generate quantized spectrum; and
   performing entropy coding on the quantized spectrum to produce compressed image that are color sensitive to the target DNN.

10. A network device comprising at least:
    a memory;
    a processor executing instructions in the memory to:
    transmit a plurality of probe images from an Internet of Things (IoT) device at an edge network to a server hosting a target deep neural network (DNN), wherein the plurality of images are injected with a limited amount of noise to probe sensitivities of the target DNN to red, green, and blue colors;
    receive a feedback comprising a plurality of discrete cosine transform (DCT) coefficients from the server hosting the target DNN, wherein the plurality of DCT coefficients are unique to the target DNN;
    compute a plurality of color conversion weights based on the feedback received from the server hosting the target DNN;
    convert a set of real-time images from RGB color space to YUV color space using the plurality of color conversion weights unique to the target DNN;
    compress the converted set of real-time images using a quantization table specific to the target DNN by the IoT device at the edge network; and
    transmit the compressed set of real-time images to the server hosting the target DNN for DNN inferences.

11. The network device of claim 10, wherein the processor further executes the instructions in the memory to:
    estimate a gradient of loss with respect to each color sensitivity by performing backward propagation of color sensitivity gradients corresponding to R, G, and B channels.

12. The network device of claim 10, wherein the plurality of color conversion weights comprise a first weight $W_R$, a second weight $W_G$, and a third weight $W_B$ corresponding to R, G, and B channels in RGB color space respectively.

13. The network device of claim 12, wherein the first weight $W_R$ is calculated as (1) a second ratio divided by (2) a sum of a first ratio, the second ratio, and 1, wherein the first ratio comprises a ratio of blue gradient over green gradient, and wherein the second ratio comprises a median ratio of red gradient over green gradient.

14. The network device of claim 12, wherein the second weight $W_G$ is calculated as 1 divided by a sum of a first ratio, a second ratio, and 1, wherein the first ratio comprises a ratio of blue gradient over green gradient, and wherein the second ratio comprises a median ratio of red gradient over green gradient.

15. The network device of claim 12, wherein the third weight $W_B$ is calculated as (1) a first ratio divided by (2) a sum of the first ratio, a second ratio, and 1, wherein the first ratio comprises a ratio of blue gradient over green gradient, and wherein the second ratio comprises a median ratio of red gradient over green gradient.

16. The network device of claim 13, wherein the first ratio and the second ratio are both median ratio across all RGB pixels of the plurality of images.

17. The network device of claim 10, wherein computing a plurality of color conversion weights based on the feedback received from the server hosting the target DNN is performed via an offline process without adding overhead to real-time image compression process.

18. The network device of claim 10, wherein the processor further executes the instructions in the memory to:
- apply DCT on a live YUV image converted from a live RGB image using the plurality of color conversion weights by the IoT device to generate a plurality of spatial spectrum;
- use a quantization table unique to the target DNN to generate quantized spectrum; and
- perform entropy coding on the quantized spectrum to produce compressed image that are color sensitive to the target DNN.

19. A non-transitory machine-readable storage medium encoded with instructions executable by a processor of a computing device, the non-transitory machine-readable storage medium comprising instructions to:
- transmit a plurality of probe images from an Internet of Things (IoT) device at an edge network to a server hosting a target deep neural network (DNN), wherein the plurality of images are injected with a limited amount of noise to probe sensitivities of the target DNN to red, green, and blue colors;
- receive a feedback comprising a plurality of discrete cosine transform (DCT) coefficients from the server hosting the target DNN, wherein the plurality of DCT coefficients are unique to the target DNN;
- compute a plurality of color conversion weights based on the feedback received from the server hosting the target DNN;
- convert a set of real-time images from RGB color space to YUV color space using the plurality of color conversion weights unique to the target DNN;
- compress the converted set of real-time images using a quantization table specific to the target DNN by the IoT device at the edge network; and
- transmit the compressed set of real-time images to the server hosting the target DNN for DNN inferences.

20. The non-transitory machine-readable storage medium of claim 19, further comprising instructions to:
- apply DCT on a live image by the IoT device to generate a plurality of DCT coefficient;
- use the quantization table to generate quantized coefficients; and
- perform entropy coding on the quantized coefficient to produce compressed image that are sensitive to the target DNN.

* * * * *